(12) United States Patent
Song et al.

(10) Patent No.: US 10,263,307 B2
(45) Date of Patent: Apr. 16, 2019

(54) ANODE FOR LITHIUM AIR BATTERY AND PREPARATION METHOD THEREOF

(71) Applicant: Hyundai Motor Company, Seoul (KR)

(72) Inventors: Jong Chan Song, Suwon-Si (KR); Ho Taek Lee, Seoul (KR); Sam Ick Son, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/377,512

(22) Filed: Dec. 13, 2016

(65) Prior Publication Data

US 2018/0053978 A1 Feb. 22, 2018

(30) Foreign Application Priority Data

Aug. 17, 2016 (KR) .................. 10-2016-0103998

(51) Int. Cl.

| H01M 4/38 | (2006.01) |
|---|---|
| H01M 4/134 | (2010.01) |
| H01M 4/1395 | (2010.01) |
| H01M 4/62 | (2006.01) |
| H01M 12/08 | (2006.01) |
| H01M 10/0568 | (2010.01) |
| H01M 10/0569 | (2010.01) |
| H01M 2/14 | (2006.01) |
| H01M 2/16 | (2006.01) |

(52) U.S. Cl.
CPC ........... *H01M 12/08* (2013.01); *H01M 2/145* (2013.01); *H01M 2/166* (2013.01); *H01M 2/1673* (2013.01); *H01M 4/134* (2013.01); *H01M 4/1395* (2013.01); *H01M 4/382* (2013.01); *H01M 4/62* (2013.01); *H01M 4/628* (2013.01); *H01M 10/0568* (2013.01); *H01M 10/0569* (2013.01); *H01M 2220/20* (2013.01); *H01M 2250/20* (2013.01); *H01M 2300/0028* (2013.01); *H01M 2300/0037* (2013.01); *H01M 2300/0068* (2013.01); *H01M 2300/0082* (2013.01); *H01M 2300/0091* (2013.01); *Y02E 60/128* (2013.01); *Y02T 90/32* (2013.01)

(58) Field of Classification Search
CPC .. H01M 4/0416; H01M 4/139; H01M 4/1395; H01M 4/22; H01M 4/23; H01M 4/382; H01M 4/628; H01M 10/0568; H01M 10/0569; H01M 12/06; H01M 12/08; H01M 2300/0037
USPC ......................................................... 429/405
See application file for complete search history.

(56) References Cited

U.S. PATENT DOCUMENTS

| 6,214,061 B1 * | 4/2001 | Visco ..................... H01M 4/04 |
| | | 29/623.5 |
| 2004/0106046 A1 * | 6/2004 | Inda .................. H01M 10/0436 |
| | | 429/322 |
| 2014/0011101 A1 * | 1/2014 | Ma ........................ H01M 12/08 |
| | | 429/405 |

FOREIGN PATENT DOCUMENTS

| CN | 105765759 A | 7/2016 |
| KR | 10-2013-0067139 | 6/2013 |
| KR | 10-2014-0006639 A | 1/2014 |
| KR | 10-2014-0082074 A | 7/2014 |

OTHER PUBLICATIONS

Bertolotti et al., *Stability in alkaline aqueous electrolyte of air electrode protected with fluorinated interpenetrating polymer network membrane*, Journal of Power Sources, No. 274, 2015, pp. 488-495, Elsevier B.V.

* cited by examiner

*Primary Examiner* — Anca Eoff
(74) *Attorney, Agent, or Firm* — Morgan, Lewis & Bockius LLP

(57) ABSTRACT

Provided herein is an anode for a lithium air battery with a long lifetime and high lithium ion conductivity and a method for preparing thereof. The anode includes a lithium metal and a protective layer disposed on one surface of the lithium metal, in which the protective layer includes an inorganic material-based solid electrolyte powder dispersed in a polymer matrix.

4 Claims, 2 Drawing Sheets

ANODE FOR LITHIUM AIR BATTERY AND PREPARATION METHOD THEREOF

CROSS-REFERENCE TO RELATED APPLICATION

This application claims under 35 U.S.C. § 119(a) the benefit of Korean Patent Application No. 10-2016-0103998, filed on Aug. 17, 2016, the entire contents of which are incorporated herein by reference for all purposes.

BACKGROUND

Technical Field

The present disclosure relates to an anode for a lithium air battery having a long lifetime and high lithium ion conductivity and a preparation method thereof.

Background Art

Currently, we are facing various environmental problems such as depletion of fossil fuels, environmental pollution, and global warming have arisen and are accompanied by rapid growth. As a countermeasure against the problems, new renewable energy is being developed, but no remarkable success has been achieved so far. Accordingly, interests in the energy storage technology, particularly, the battery field has been rapidly increasing.

As a result, significant progress has been made in the field of lithium ion batteries. However, the lithium ion batteries to date are insufficient to replace fossil fuels due to their low energy density.

Thus, the recent development of the metal-air battery, particularly, the lithium air battery has been actively pursued in the developed countries such as the United States and Japan.

The lithium air battery uses oxygen as an active material that can be supplied infinitely from the air. Therefore, in theory it is possible to obtain a very high energy density. When a theoretical energy density of the lithium air battery is calculated, the value is about 3,200 Wh/kg, which is about 10 times higher than a lithium ion battery. Further, the lithium air battery uses oxygen as an active material, and thus also has the advantage of being environmentally friendly.

However, the short lifetime of the lithium air battery remains as a big obstacle to commercialization. The short lifetime of the lithium air battery attributes to a dramatic change in the structure of the surface of the lithium electrode (anode) during the charge and discharge of the battery, and thus the accumulation of the decomposed product accordingly. Therefore, a stabilized lithium electrode (anode) is desired in order to commercialize the lithium air battery.

For this purpose, Korean Patent Application Nos. 10-2013-0067139 and 10-2014-0006639 introduced a protective film into a lithium electrode (anode). In related art, other patents used an inorganic material-based solid electrolyte such as LISICON and LATP as a material for a protective film. The inorganic material-based solid electrolyte has excellent mechanical properties, and thus may stably protect the lithium electrode (anode) and may suppress the structural change of the surface thereof. However, the ion conductivity of the inorganic material-based solid electrolyte is only about $10^{-6}$ S/cm to $10^{-5}$ S/cm, which is a very low level at normal temperature. Consequently, the resistance resulting from the driving of the lithium air battery is severely increased, and the efficiency of the battery significantly deteriorates.

Thus, there is a need for a battery technology which does not degrade the efficiency of the battery due to excellent ion conductivity but provides stable protection of the lithium electrode (anode).

CITATION LIST

Patent Document

Korean Patent Application Laid-Open No. 10-2013-0067139
Korean Patent Application Laid-Open No. 10-2014-0006639

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with prior art, and an object of the present invention is to provide an anode for a lithium air battery having excellent lithium ion conductivity while being able to stably protect a lithium metal.

The object of the present invention is not limited to the aforementioned object. The object of the present invention will be more apparent from the following description and will be realized by means described in the claims and by combinations thereof.

The present invention may include the following configuration in order to achieve the above-described object.

In one aspect, the present invention provides an anode for a lithium air battery including: a lithium metal; and a protective layer disposed on one surface of the lithium metal, in which the protective layer may include an inorganic material-based solid electrolyte powder dispersed in a polymer matrix.

In a preferred embodiment, the polymer matrix may one or more of polyethylene, polypropylene, an ethylene propylene copolymer, polyvinyl chloride, polyvinylidene chloride, polystyrene, polyacrylonitile, polytetrafluoroethylene, polymethylmethacrylate, polyvinylacetate, polyisoprene, polychloroprene, polyester, polycarbonate, polyamide, polyacrylate, polyurethane, an acrylonitrile-butadiene-styrene copolymer, polyoxyethylene, polyoxymethylene, polyoxypropylene, a styrene-acrylonitrile copolymer, an acrylonitrile-styrene-acrylate copolymer, a styrene-butadiene copolymer, an acrylatedstyrene-butadiene copolymer, an acrylonitrile-butadiene copolymer, an acrylic rubber, a butyl rubber, a fluorine rubber, polyvinylpyrrolidone, polyepichlorohydrin, polyphosphazene, polyvinyl pyridine, chlorosulfonated polyethylene, polysulfone, polyvinyl alcohol, carboxymethyl cellulose, hydroxypropylmethyl cellulose, hydroxypropyl cellulose, diacetyl cellulose, polyvinylidene fluoride, and a polyvinylidene fluoride-hexafluoropropyl copolymer (PVDF-HFP), which are organic material-based polymers.

In another preferred embodiment, the inorganic material-based solid electrolyte powder may be one or more of $Li_3BO_3$, $Li_aLa_bZr_cO_d$ (a is 6.3 to 8, b is 2.7 to 3.3, and c is 1.7 to 2.3), and $Li_{1+x+y}Al_xM_{2-x}Si_yP_{3-y}O_{12}$ (x is 0 to 1, y is 0 to 1, and M is Ti or Ge).

In still another preferred embodiment, the inorganic material-based solid electrolyte powder may have a particle size of from about 10 nm to about 1 μm (e.g., about 10 nm, 50, 100, 150, 200, 250, 300, 350, 400, 450, 500, 550, 600, 650, 700, 750, 800, 850, 900, 950 nm, or about 1 μm).

In a preferred exemplary embodiment of the present invention, the protective layer may have a thickness of from about 10 μm to about 500 μm (e.g., about 10 μm, 20, 30, 40, 50, 60, 70, 80, 90, 100, 110, 120, 130, 140, 150, 160, 170, 180. 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, or about 500 μm).

In yet another preferred embodiment, the protective layer may further include a liquid electrolyte.

In still yet another preferred embodiment, the liquid electrolyte may be a liquid electrolyte obtained by adding one or more lithium salts of $LiPF_6$, $LiBF_4$, $LiSbF_6$, $LiAsF_5$, $LiClO_4$, $Li_3N$, $LiCF_3SO_3$, $LiN(SO_2CF_3)_2$, $LiN(SO_2C_2F_5)_2$, $LiC(SO_2CF_3)_3$, $LiPF_4(CF_3)_2$, $LiPF_3(C_2F_5)_3$, $LiPF_3(CF_3)_3$, $LiPF_5(iso-C_3F_7)$, $(CF_2)_2(SO_2)_2NLi$, and $(CF_2)_3(SO_2)_2NLi$ to one or more organic solvents of dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), and butylene carbonate (BC).

In another aspect, the present invention provides a method for preparing an anode for a lithium air battery including: (1) preparing a dispersion including an inorganic material-based solid electrolyte powder, an organic material-based polymer, and a liquid electrolyte; (2) applying the dispersion onto a lithium metal; (3) drying the lithium metal onto which the dispersion is applied to form a protective layer; and (4) rolling the lithium metal on which the protective layer is formed.

In a preferred embodiment, the dispersion may include about 30 wt % to about 70 wt % (e.g., about 30 wt %, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or about 70 wt %) of an inorganic material-based solid electrolyte powder, about 3 wt % to about 20 wt % (e.g., about 3 wt %, 4, 5, 6, 7, 8, 9, 10, 11, 12, 13, 14, 15, 16, 17, 18, 19 or about 20 wt %) of an organic material-based polymer, and from about 10 wt % to about 60 wt % (e.g., about 10 wt %, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 wt %) of a liquid electrolyte.

The present invention includes the aforementioned configurations, and thus has the following effects.

The anode for the lithium air battery according to the present invention may provide a lithium air battery having a long lifetime and high battery efficiency because an inorganic material-based solid electrolyte powder stably protects a lithium metal and a polymer matrix functions as a channel for lithium ion conduction to improve the lithium ion conductivity.

According to the present invention, it is possible to easily prepare a lithium air battery having a long lifetime and high battery efficiency because a sintering process at high temperature need not be performed.

The effects of the present invention are not limited to the aforementioned effects. The effects of the present invention are to be understood to include all the effects capable of being inferred from the following explanation.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
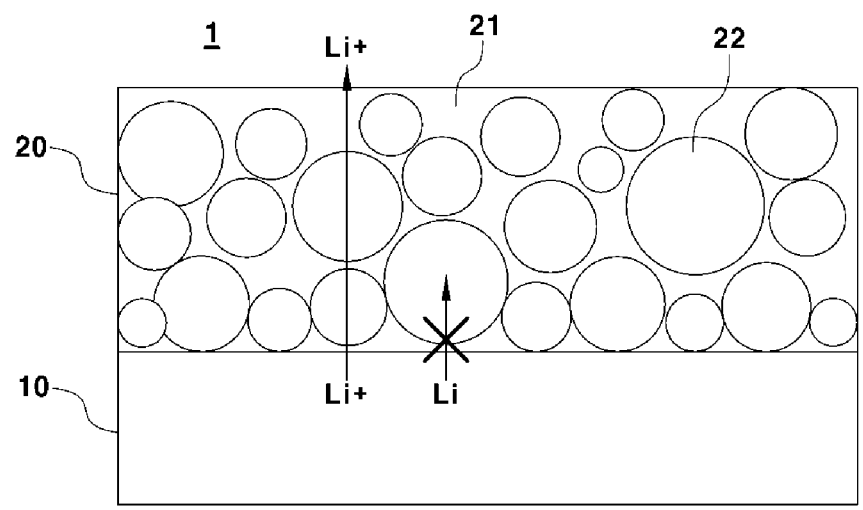
FIG. 1 illustrates an anode for a lithium air battery according to the present invention.

Reference numerals set forth in the Drawings includes reference to the following elements as further discussed below.

1: anode for a lithium air battery
10: lithium metal
20: protective layer
21: polymer matrix
22: inorganic material-based solid electrolyte powder It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, the present invention will be described in detail through Examples. The Examples of the present invention may be modified in various forms as long as the gist of the invention is not changed. However, the right scope of the present invention is not limited to the following Examples.

If it is judged that publicly known configurations and functions may obscure the gist of the present invention, the description on the publicly known configurations and functions will be omitted. The term "including" in the present specification means further including other constituent elements unless otherwise specifically described.

A lithium air battery is a battery system which uses a lithium metal as an anode and uses oxygen in the air as an active material in an air electrode (cathode). An oxidation and reduction reaction of lithium occurs in the anode, and a reduction and oxidation reaction of oxygen introduced from the outside occurs in the air electrode.

Hereinafter, Chemical Formulae 1 and 2 denote reactions occurring in the anode and the air electrode when a lithium air battery is discharged.

(Anode): Li→Li$^+$+e$^-$  [Chemical Formula 1]

(Air electrode): 2Li$^+$+O$_2$+2e$^-$→Li$_2$O$_2$  [Chemical Formula 2]
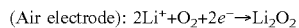

The lithium metal in the anode is oxidized to produce lithium ions and electrons. The lithium ions and the electrons move to the air electrode through the electrolyte and through the external conducting wire or the current collector, respectively. Since the air electrode is porous, the external air may be introduced into the air electrode. Oxygen included in the external air is reduced by the electrons in the air electrode, and Li$_2$O$_2$ is formed.

The charge reaction proceeds in the opposite manner. That is, Li$_2$O$_2$ is decomposed in the cathode as in the following Chemical Formula 3, and as a result, lithium ions and electrons are produced.

(Cathode): Li$_2$O$_2$→2Li$^+$+O$_2$+2e$^-$  [Chemical Formula 3]
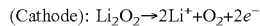

As the charge and discharge reaction as described above proceeds, the structure on the surface of the cathode is altered, and accordingly, there occurs a problem in that the lifetime of the lithium air electrode is shortened due to the accumulation of decomposition products.

The present invention has been made in an effort to solve the aforementioned problem and to provide an anode for a lithium air battery having excellent lithium ion conductivity while being able to safely protect the lithium metal.

FIG. 1 illustrates an anode for a lithium air battery according to the present invention.

An anode 1 for a lithium air battery according to the present invention includes a lithium metal 10 and a protective layer 20 disposed on one surface of the lithium metal 10, and the protective layer 20 includes an inorganic material-based solid electrolyte powder 22 dispersed in a polymer matrix 21.

In the related art, a thin film composed of only an inorganic material-based solid electrolyte as a protective layer of a lithium metal was applied. The protective layer in the related art was able to stably protect a lithium metal, but had a limitation in that the lithium ion conductivity is very low.

Thus, the present invention has a technical feature of developing a protective layer having excellent mechanical properties and high lithium ion conductivity by introducing an inorganic material-based solid electrolyte in a powder form, and forming a matrix of an organic material-based polymer material in a form of surrounding the inorganic material-based solid electrolyte powder.

Hereinafter, each configuration of the anode for the lithium air battery will be specifically described.

The inorganic material-based solid electrolyte powder 22 may use any material as long as the inorganic material-based solid electrolyte powder 22 may prevent a structural alteration of the surface of the lithium metal, an elution of the lithium metal, and the like, but preferably, may use an inorganic material-based solid electrolyte material containing lithium ions. Specifically, the inorganic material-based solid electrolyte powder 22 may be Li$_3$BO$_3$, Li$_a$La$_b$Zr$_c$O$_d$ (a is 6.3 to 8, b is 2.7 to 3.3, c is 1.7 to 2.3, and d is determined according to a to c), and Li$_{1+x+y}$Al$_x$M$_{2-x}$Si$_y$P$_{3-y}$O$_{12}$ (x is 0 to 1, y is 0 to 1, and M is Ti or Ge), and more specifically Li$_3$BO$_3$ or Li$_{6.7}$La$_3$Zr$_2$O$_{12}$.

The inorganic material-based solid electrolyte powder is introduced into the protective layer in the form of micronized powders as illustrated in FIG. 1, and thus allows the polymer matrix to serve as a conduction channel for lithium ion conduction as will be described below.

Meanwhile, when the particle size of the inorganic material-based solid electrolyte powder is extremely large, the void between the inorganic material-based solid electrolyte powders is increased, and as a result, there may occur a problem in that the mechanical strength of the protective layer deteriorates. Therefore, the inorganic material-based solid electrolyte powder may have a particle size of preferably about 10 nm to about 1 μm (e.g., about 10 nm, 50, 100, 150, 200, 250, 300, 350, 400, 450, 500, 550, 600, 650, 700, 750, 800, 850, 900, 950 or about 1 μm).

The polymer matrix 21 has a configuration of serving as a lithium ion conductor and a binder. The polymer matrix 21 may impart bonding force to the inorganic material-based solid electrolyte powders to allow the protective layer to maintain the form, and serves as a kind of conduction channel such that the lithium ions generated from the lithium metal may easily pass through the protective layer.

It may be preferred that the polymer matrix is formed of an organic material-based polymer having excellent bonding force and lithium ion conductivity. Particularly, the organic material-based polymer may be one or more of polyethylene, polypropylene, an ethylene propylene copolymer, polyvinyl chloride, polyvinylidene chloride, polystyrene, polyacrylonitrile, polytetrafluoroethylene, polymethylmethacrylate, polyvinylacetate, polyisoprene, polychloroprene, polyester, polycarbonate, polyamide, polyacrylate, polyurethane, an acrylonitrile-butadiene-styrene copolymer, polyoxyethylene, polyoxymethylene, polyoxypropylene, a styrene-acrylonitrile copolymer, an acrylonitrile-styrene-acrylate copolymer, a styrene-butadiene copolymer, an acrylatedstyrene-butadiene copolymer, an acrylonitrile-butadiene copolymer, an acrylic rubber, a butyl rubber, a fluorine rubber, polyvinylpyrrolidone, polyepichlorohydrin, polyphosphazene, polyvinyl pyridine, chlorosulfonated polyethylene, polysulfone, polyvinyl alcohol, carboxymethyl cellulose, hydroxypropylmethyl cellulose, hydroxypropyl cellulose, diacetyl cellulose, polyvinylidene fluoride, and a polyvinylidene fluoride-hexafluoropropyl copolymer (PVDF-HFP), and more specifically polyvinylidene fluoride or a polyvinylidene fluoride-hexafluoropropyl copolymer (PVDF-HFP).

A protective layer composed of only the inorganic material-based solid electrolyte in the related art may maintain the form as it is only when being subjected to a high-temperature sintering process and a high-pressure compression process. In contrast, in the case of the present invention, a protective layer may be easily formed without being subjected to the processes as described above because the polymer matrix serves as a binder.

The present invention may compensate for the low lithium ion conductivity of the inorganic material-based solid electrolyte because the polymer matrix is formed of an organic material-based polymer having high lithium ion conductivity.

The protective layer may further include a liquid electrolyte (not illustrated). The liquid electrolyte is for further improving the lithium ion conductivity of the protective layer.

The liquid electrolyte may be an electrolyte obtained by adding a lithium salt to an organic solvent.

Specifically, the organic solvent may be one or more of dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), and butylene carbonate (BC).

In addition, the lithium salt may be one or more of $LiPF_6$, $LiBF_4$, $LiSbF_6$, $LiAsF_5$, $LiClO_4$, $Li_3N$, $LiCF_3SO_3$, $LiN(SO_2CF_3)_2$, $LiN(SO_2C_2F_5)_2$, $LiC(SO_2CF_3)_3$, $LiPF_4(CF_3)_2$, $LiPF_3(C_2F_5)_3$, $LiPF_3(CF_3)_3$, $LiPF_5(iso-C_3F_7)$, $(CF_2)_2(SO_2)_2NLi$, and $(CF_2)_3(SO_2)_2NLi$.

The protective layer 20 may be formed to have a thickness of 10 μm to 500 μm (e.g., about 10 μm, 20, 30, 40, 50, 60, 70, 80, 90, 100, 110, 120, 130, 140, 150, 160, 170, 180. 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, or about 500 μm). When the thickness is less than 10 μm, the lithium metal may not be effectively protected, and when the thickness is more than 500 μm, the lithium ion conductivity may deteriorate.

The anode for the lithium air battery according to the present invention may be prepared by (1) preparing a dispersion including the inorganic material-based solid electrolyte powder, the organic material-based polymer, and the liquid electrolyte, (2) applying the dispersion onto a lithium metal, (3) drying the lithium metal onto which the dispersion is applied to form a protective layer, and (4) rolling the lithium metal on which the protective layer is formed.

The description on each configuration of the anode for the lithium air battery was described above, and thus will be omitted below.

The method for preparing an anode for a lithium air battery according to the present invention does not include a high-temperature sintering process and a high-pressure compression process. This is because the polymer matrix formed from the organic material-based polymer is firmly bonded to the inorganic material-based solid electrolyte powder as a binder.

The dispersion may include from about 30 wt % to about 70 wt % (e.g., about 30 wt %, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or about 70 wt %) of the inorganic material-based solid electrolyte powder, from about 3 wt % to about 20 wt % (e.g., about 3 wt %, 4, 5, 6, 7, 8, 9, 10, 11, 12, 13, 14, 15, 16, 17, 18, 19 or about 20 wt %) of the organic material-based polymer, and from about 10 wt % to about 60 wt % (e.g., about 10 wt %, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 wt %) of the liquid electrolyte. When each configuration is included in the content range, the lithium ion conductivity may be increased while maintaining the mechanical strength of the protective layer.

In Step (2), the method of applying the dispersion is not limited, but the application may be performed by a method such as a spin coating method and a casting method.

Step (3) may be a step of vacuum drying a lithium metal onto which a dispersion is applied at room temperature (about 25° C.) for about 30 minutes to about 1 hour to form a protective layer on the lithium metal.

Step (4) is a step of compressing the lithium metal on which the protective layer is formed at room temperature (about 25° C.) to increase the bonding force between the protective layer and the lithium metal and improve the volume density of the inorganic material-based solid electrolyte powder.

Hereinafter, specific Examples of the present invention will be suggested. However, the Examples described below are provided for specifically exemplifying or explaining the present invention, and the present invention is not limited thereto.

EXAMPLES

The following examples illustrate the invention and are not intended to limit the same.

Example 1

A dispersion was prepared by mixing a mixture in which 1 M $LiClO_4$ (37.5 wt %) was added to $Li_3BO_3$ (50 wt %) as an inorganic material-based solid electrolyte powder, PVDF-HFP (12.5 wt %) as an organic material-based polymer, and an organic solvent PC as a liquid electrolyte.

The dispersion was applied onto the surface of a lithium metal.

The lithium metal onto which the dispersion was applied was vacuum dried at room temperature (about 25° C.) for about 30 minutes to form a protective layer on the lithium metal.

The lithium metal on which the protective layer was formed was rolled with a roll press at room temperature (about 25° C.), thereby completing an anode for a lithium air electrode.

An air electrode for a lithium air battery was formed by the following method. A slurry was prepared by mixing Ketjen black (KB) which is a porous carbon material having a large surface area, a polymer binder (polytetrafluoroethylene, PTFE), and a solvent (DI water) and stirring the mixture using a homogenizer. A carboxymethyl cellulose (CMC) polymer as a thickener for adjusting the viscosity was added to the slurry. The mixing ratio of the carbon material (KB), the polymer binder (PTFE), and the thickener (CMC) was 70:15:15 [wt %]. The slurry was casted on a nickel foam substrate having a thickness of 200 μm, and the substrate was dried primarily at 80° C. in a convection oven overnight. An air electrode was completed by secondarily drying the substrate at 100° C. in a vacuum oven. The amount of carbon material (KB) loaded in the air electrode was about 2 mg/cm².

A lithium air battery was formed of 2032 type coin cells by using the anode and the air electrode. The anode, a polyethylene (PE) separation membrane, the air electrode, and a gas diffusion layer (GDL) were sequentially laminated in a case having through holes through which oxygen is capable of passing, and then an electrolytic solution was injected into the laminated body. As the electrolytic solution, 1 M LITFSI in DEGDEE was used. Thereafter, a cap of the case was covered and was subjected to a sealing treatment to complete the lithium air battery.

Example 2

A lithium air battery was prepared by the same materials and methods as those in Example 1, and in Step (1), $Li_{6.7}La_3Zr_2O_{12}$ was used as the inorganic material-based solid electrolyte, and a liquid electrolyte, in which 1 M $LiClO_4$ was added to an EC/PC mixed solvent (mixed at a volume ratio of 1:1) which is an organic solvent, was used as the liquid electrolyte.

Comparative Example 1

A lithium air battery was prepared by the same materials and methods as those in Example 1, except that in Step (1) of Example 1, $Al_2O_3$ was used as the inorganic material-based solid electrolyte.

Comparative Example 2

A lithium air battery cell was prepared by the same materials and methods as those in Comparative Example 1, and in Step (1), a liquid electrolyte, in which 3 M $LiClO_4$ was added to an organic solvent PC, was used as the liquid electrolyte.

The compositions and thicknesses of the protective layers included in the anodes for the lithium air battery according to Examples 1 and 2 and Comparative Examples 1 and 2 are summarized in the following Table 1.

TABLE 1

| Classification | Composition of protective layer [weight ratio] | Thickness of protective layer [μm] |
| --- | --- | --- |
| Example 1 | $Li_3BO_3$/PVDF-HFP/ 1M $LiClO_4$ in PC | 67 |
| Example 2 | $Li_{6.7}La_3Zr_2O_{12}$/PVDF-HFP/ 1M $LiClO_4$ in EC/PC | 50 |
| Comparative Example 1 | $Al_2O_3$/PVDF-HFP/ 1M $LiClO_4$ in PC | 38 |
| Comparative Example 2 | $Li_3BO_3$/PVDF-HFP/ 3M $LiClO_4$ in PC | 28 |

Test Examples

Test Example—Measurement of Impedance Lithium Ion Conductivity

The impedances of the lithium air batteries according to Examples 1 and 2 and Comparative Examples 1 and 2 were measured, and the lithium ion conductivities were calculated through the impedances.

The impedance value (Z im) of each lithium air battery was measured under the conditions 1 MHz to 1 Hz, 100 mV, and 20° C. (measuring apparatus: ZIBE-MP5, WonA Tech). The resistance value (Z re) of each lithium air battery was obtained by using the impedance value measured and the Nyquist plot graph as in FIG. 2.

Figure 2:
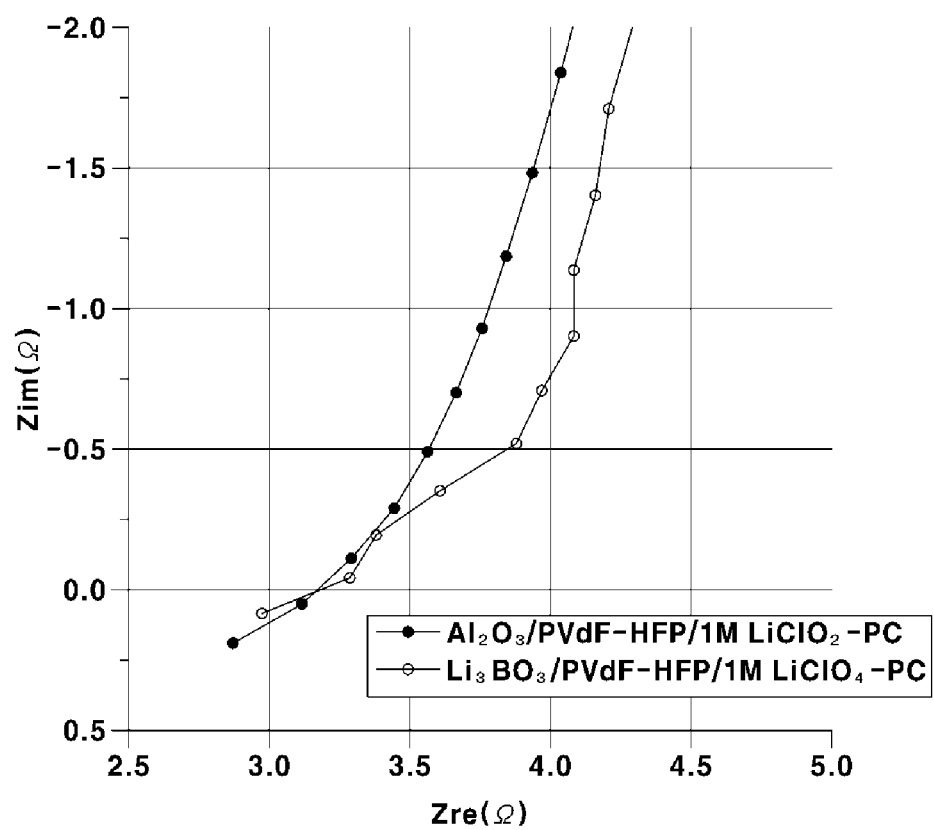
FIG. 2 is a graph illustrating a correlation of an impedance value with a resistance value according to a Test Example of the present invention.

Referring to FIG. 2, it can be seen that Example 1 in which an inorganic material-based solid electrolyte containing lithium was used exhibited a lower impedance value (Z im) at a predetermined resistance value (Z re) than that in Comparative Example 1. This means that current easily flows when the lithium air battery according to Example 1 is charged and discharged, that is, the resistance is lower than that in Comparative Example 1 during the charge and discharge. Thus, the power loss of the lithium air battery according to Example 1 may be decreased when driven at high power.

The following Equation was used in order to calculate the lithium ion conductivity of the lithium air battery.

$$\sigma = 1/(R \cdot A)$$

Here, σ means ion conductivity [S/cm].
R means a resistance [Ω].
A means an area [$cm^2$] of an electrode.
l means a length [cm] of an electrode in a cross-sectional direction perpendicular to A, that is, in a direction in which current flows.

The results are shown in the following Table 2.

TABLE 2

| Classification | Lithium ion conductivity |
| --- | --- |
| Example 1 | $8.3 \times 10^{-4}$ S/cm |
| Example 2 | $1.01 \times 10^{-3}$ S/cm |
| Comparative Example 1 | $4.7 \times 10^{-4}$ S/cm |
| Comparative Example 2 | $6.1 \times 10^{-4}$ S/cm |

Considering that the lithium ion conductivity of a lithium air battery including a protective layer composed of only an inorganic material-based solid electrolyte in the related art is at a level of about $10^{-6}$ S/cm to $10^{-5}$ S/cm at room temperature, all of the Examples 1 and 2 and Comparative Examples 1 and 2 exhibit higher lithium ion conductivity than that of the lithium air battery in the related art.

However, it can be seen that Examples 1 and 2 in which an inorganic material-based solid electrolyte containing lithium was used as the inorganic material-based solid, particularly, Example 2, in which $Li_{6.7}La_3Zr_2O_{12}$, which is an inorganic material-based solid electrolyte having a garnet-like structure, was used, exhibited significantly high lithium ion conductivity.

As described above, in the anode for the lithium air battery according to the present invention, since an inorganic material-based solid electrolyte powder stably protects a lithium metal and a polymer matrix functions as a channel for lithium ion conduction to improve the lithium ion conductivity, it is possible to provide a lithium air battery having a long lifetime and high battery efficiency when the anode is used.

According to the present invention, the polymer matrix functions as a binder for the inorganic material-based solid electrolyte powder, so that an anode for a lithium air battery may be prepared without being subjected to a high-temperature sintering process in forming a protective layer.

The Examples of the present invention have been described in detail as described above, but the right scope of the present invention is not limited to the above-described Examples, and various modifications and improvements by the person skilled in the art using the basic concepts of the present invention defined in the following claims also fall within the right scope of the present invention.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for preparing an anode for a lithium air battery, the method comprising:

(1) preparing a dispersion comprising an inorganic material-based solid electrolyte powder, an organic material-based polymer, and a liquid electrolyte;
(2) applying the dispersion onto a lithium metal;
(3) drying the lithium metal onto which the dispersion is applied to form a protective layer; and
(4) rolling the lithium metal on which the protective layer is formed,
wherein the dispersion comprises about 30 wt % to about 70 wt % of an inorganic material-based solid electrolyte powder, about 3 wt % to about 20 wt % of an organic material-based polymer, and about 10 wt % to about 60 wt % of a liquid electrolyte.

2. The method of claim 1, wherein the organic material-based polymer is one or more of polyethylene, polypropylene, an ethylene propylene copolymer, polyvinyl chloride, polyvinylidene chloride, polystyrene, polyacrylonitile, polytetrafluoroethylene, polymethylmethacrylate, polyvinylacetate, polyisoprene, polychloroprene, polyester, polycarbonate, polyamide, polyacrylate, polyurethane, an acrylonitrile-butadiene-styrene copolymer, polyoxyethylene, polyoxymethylene, polyoxypropylene, a styrene-acrylonitrile copolymer, an acrylonitrile-styrene-acrylate copolymer, a styrene-butadiene copolymer, an acrylatedstyrene-butadiene copolymer, an acrylonitrile-butadiene copolymer, an acrylic rubber, a butyl rubber, a fluorine rubber, polyvinylpyrrolidone, polyepichlorohydrin, polyphosphazene, polyvinyl pyridine, chlorosulfonated polyethylene, polysulfone, polyvinyl alcohol, carboxymethyl cellulose, hydroxypropylmethyl cellulose, hydroxypropyl cellulose, diacetyl cellulose, polyvinylidene fluoride, and a polyvinylidene fluoride-hexafluoropropyl copolymer (PVDF-HFP).

3. The method of claim 1, wherein the inorganic material-based solid electrolyte powder is one or more of $Li_3BO_3$, $Li_aLa_bZr_cO_d$ (a is 6.3 to 8, b is 2.7 to 3.3, c is 1.7 to 2.3, and d is determined according to a to c), and $Li_{1+x+y}Al_xM_{2-x}Si_yP_{3-y}O_{12}$ (x is 0 to 1, y is 0 to 1, and M is Ti or Ge).

4. The method of claim 1, wherein the liquid electrolyte is a liquid electrolyte obtained by adding one or more lithium salts of $LiPF_6$, $LiBF_4$, $LiSbF_6$, $LiAsF_5$, $LiClO_4$, $Li_3N$, $LiCF_3SO_3$, $LiN(SO_2CF_3)_2$, $LiN(SO_2C_2F_5)_2$, $LiC(SO_2CF_3)_3$, $LiPF_4(CF_3)_2$, $LiPF_3(C_2F_5)_3$, $LiPF_3(CF_3)_3$, $LiPF_5(iso-C_3F_7)$, $(CF_2)_2(SO_2)_2NLi$, and $(CF_2)_3(SO_2)_2NLi$ to one or more organic solvents of dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), and butylene carbonate (BC).

* * * * *